United States Patent [19]

Tangney

[11] Patent Number: 5,082,706

[45] Date of Patent: Jan. 21, 1992

[54] PRESSURE SENSITIVE ADHESIVE/RELEASE LINER LAMINATE

[75] Inventor: Thomas J. Tangney, Midland, Mich.

[73] Assignee: Dow Corning Corporation, Midland, Mich.

[21] Appl. No.: 276,178

[22] Filed: Nov. 23, 1988

[51] Int. Cl.[5] .......................... C09J 7/00; C09J 143/04
[52] U.S. Cl. ....................................... 428/40; 428/352; 428/355; 428/447
[58] Field of Search ................. 428/40, 352, 355, 447

[56] References Cited

U.S. PATENT DOCUMENTS

| | | | |
|---|---|---|---|
| 2,676,182 | 4/1954 | Daudt | 556/453 |
| 2,736,721 | 2/1956 | Dexter | 525/477 |
| 2,814,601 | 11/1957 | Currie | 525/478 |
| 2,857,356 | 10/1958 | Goodwin | 525/477 |
| 2,961,425 | 11/1960 | Pierce | 556/454 |
| 3,284,406 | 11/1966 | Nelson | 525/477 |
| 3,344,160 | 9/1967 | Holbrook | 556/451 |
| 3,419,593 | 12/1968 | Willing | 556/479 |
| 3,527,842 | 9/1970 | Brown | 428/450 |
| 3,528,940 | 9/1970 | Modic | 524/493 |
| 3,983,298 | 9/1976 | Hahn | 428/447 |
| 4,057,566 | 11/1977 | Carter | 556/434 |
| 4,309,520 | 1/1982 | Blizzard | 525/477 |
| 4,584,355 | 4/1986 | Blizzard | 525/477 |
| 4,591,622 | 5/1986 | Blizzard | 525/477 |
| 4,736,048 | 4/1988 | Brown | 556/454 |
| 4,774,297 | 9/1988 | Murakami | 525/478 |
| 4,980,440 | 12/1990 | Kendziorski et al. | 528/15 |

*Primary Examiner*—Jenna Davis
*Attorney, Agent, or Firm*—George A. Grindahl

[57] ABSTRACT

Addition-curable silicone pressure sensitive adhesives can be covered with an addition-cured fluorosilicone release coating to provide a releasable laminate. The release force of the laminate is low to moderate and the subsequent adhesion and tack of the adhesive is high and all three values are stable with time. The laminate can be prepared by contacting the release coating with cured adhesive or by curing the adhesive in contact with the release coating.

6 Claims, 1 Drawing Sheet

PRESSURE SENSITIVE ADHESIVE/RELEASE LINER LAMINATE

BACKGROUND OF THE INVENTION

The present invention relates to a laminate article of manufacture. More specifically, the present invention relates to a laminate comprising a silicone pressure sensitive adhesive and a fluorosilicone release liner.

The adhesive aggressiveness of silicone pressure-sensitive adhesives, hereinafter called SPSAs for brevity and convenience, is well documented in the silicone art. While aggressive adhesiveness, i.e. tack and/or adhesive strength, of SPSAs has utility it is also a significant problem. Whether the SPSA has the form of, for example, an adhesive layer on a substrate in the form of a roll of tape; an adhesive layer on an article protected with a peelable backing, such as a decorative trim item to be adhered to an automobile or a medical item to be adhered to the skin of a person; or a transfer adhesive layer protected on two surfaces by peelable backings, the SPSA must be separated from an adjacent surface before it can be used for its intended purpose.

Substantially every material that has been used as a protective backing or as a tape substrate for SPSAs has been given some sort of surface treatment to facilitate the removing of the adjacent surface from the adhesive without adhesive separation or transfer and with a force sufficiently small to avoid the tearing of the substrate, item or backing.

Recently, Brown and Stickles, U.S. Pat. No. 4,736,048, disclosed a fluorosilicone release liner which is said to be useful for releasing solvent-cast, heat-cured SPSAs with a force of no more than 200 grams per inch. Patentees provided examples of laminates comprising peroxide-cured SPSAs, which had been solvent-cast and heat-cured in contact with their fluorosilicone liner. However, they did not disclose any examples of a laminate comprising a platinum-cured SPSA.

In general, peroxide-cured compositions are used as silicone pressure sensitive adhesive compositions. For example see U.S. Pat. Nos. 2,736,721; 2,814,601; 2,857,356; 3,528,940; 3,929,704; 4,309,520; 4,584,355; 4,591,622; Canadian Patent No. 711,756; and British Patent No. 998,232. Platinum-cured SPSAs, also known as addition-cured SPSAs, are also known. For example, see U.S. Pat. Nos. 3,527,842; 3,983,298; 4,774,297; and Japanese Patent Application No. 283,343/86.

There is a trade-off between the release force needed to remove a SPSA from its liner and the adhesive properties of the SPSA subsequent to its removal from the liner. For example, a peroxide-curable SPSA can be formulated to have moderate to high levels of subsequent adhesion (>1200 grams per inch) and subsequent tack (>1100 grams per square centimeter); however these formulation have release which is unstable with aging. On the other hand, if the adhesive is formulated to have low release, low tack (<800 grams per inch) are obtained.

BRIEF SUMMARY OF THE INVENTION

The above-noted deficiencies in the art are overcome by the article of this invention which, briefly summarized, comprises forming a laminate comprising an addition-curing SPSA and an addition-cured fluorosilicone release coating. It was surprising to discover that the release force needed to separate an addition-cured SPSA from an addition-cured fluorosilicone release coating, after it had been cast onto and cured in contact with the release coating, could have a stable value of less than 300 grams per inch, while at the same time displaying stable subsequent adhesiveness and stable subsequent tack.

The curable fluorosilicone composition comprises a fluorosilicone polymer which will provide a durably adhered, fully cured coating having a low surface energy and a high degree of molecular chain flexibility. This polymer is mixed with a curing agent and coated and cured onto a backing for the purpose of releasing normally tacky adhesives.

The pressure sensitive adhesive composition can be cured at relatively low temperatures into a pressure sensitive adhesive having an excellent tack and cohesive strength and a high adhesive strength. The composition has specified quantities of an alkenyl radical-terminated polydiorganosiloxane, an organopolysiloxane composed of $R^2{}_3$, $SiO_{1/2}$ units and $SiO_2$ units, an organopolysiloxane having at least 2 silicon-bonded hydrogen atoms in each molecule, and a platinum-containing catalyst.

DETAILED DESCRIPTION OF THE INVENTION

The present invention relates to a laminate article of manufacture comprising a layer of silicone pressure sensitive adhesive and at least one liner adhered to at least a portion of said layer; said silicone pressure sensitive adhesive being the reaction product of components comprising (a) 30 to 70 weight parts of a polydiorganosiloxane having the general formula $R^1R_2SiO(R_2SiO)_n$-$Si_2R^1$ wherein each R is a monovalent hydrocarbon radical, each $R^1$ is an alkenyl radical and n is an integer, (b) 70 to 30 weight parts of an organopolysiloxane which is constituted of $R^2{}_3SiO_{1/2}$ units and $SiO_2$ units in a molar ratio in the range of 0.6:1 to 0.9:1. wherein $R^2$ is selected from the group consisting of alkyl radicals, alkenyl radicals, and the hydroxyl radical, and the methyl radical comprises at least 95 mol percent of all $R^2$ radicals, (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl radical in Component (a), and (d) a platinum-containing catalyst in a quantity sufficient to provide 0.1 to 1,000 weight parts platinum for each one million weight parts of the combined quantity of Components (a) through (c); and said liner comprising a backing bearing an adhesive-releasing coating durably adhered thereto which is the reaction product of components consisting essentially of (e) a fluorosilicone polymer having the formula $YMe_2SiO(Me_2SiO)_x\{R^3QSi(Me)O\}_y(MeASiO)_zSiMe_2Y$, wherein Y denotes a radical selected from the group consisting of Me, $R^3Q$ or A, A denotes an alkenyl radical and Me denotes the methyl radical, $R^3$ denotes a perfluoroalkyl radical having from 2 to 8 carbon atoms, Q denotes a divalent hydrocarbon radical linking the $R^3$ radical to a silicon atom by at least 2 carbon atoms, and the values of x, y and z are such that the fluorosilicone polymer contains from 0.1 to 10 mol percent alkenyl-containing siloxane units and at least 5 mol percent siloxane units which bear $R^3Q$ radicals, (f) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl radical in Component (e), and (g) a platinum-containing catalyst in a quantity sufficient to provide 0.1 to 1,000 weight parts platinum for each one million weight parts of the combined quantity of Components (e) and (f). Component (a) that is used to prepare the SPSA is a polydiorganosiloxane having the general formula $R^1R_2SiO(R_2SiO)_nSiR_2R^1$ which must have an alkenyl radical, which is essential to the addition reaction, at both of its molecular terminals.

R in the above formula can be any monovalent hydrocarbon radical, for example, alkyl radicals such as methyl, ethyl, propyl, etc.; alkenyl radicals such as vinyl, allyl, propenyl, etc.; and aryl radicals such as the phenyl radical, etc. R preferably contains from 1 to 6 carbon atoms and methyl is in general a preferred R radical. When heat resistance is required, the phenyl radical and methyl radical will be present together in Component (a).

$R^1$ is an alkenyl radical, preferably containing 1 to 6 carbon atoms, such as vinyl, allyl, propenyl, etc.; the vinyl radical is most preferred.

Generally, there is no specific restriction on the molecular weight of Component (a), or on the value of n in the above formula, as long as no adverse effects accrue with respect to the workability of the pressure sensitive adhesive composition in practical applications. A solventless pressure sensitive adhesive composition can be prepared when n is an integer such that the viscosity of Component (a) is no more than 100,000 centipoise. A viscosity-reducing solvent is typically necessary when the value of n and the molecular weight of Component (a) provides a viscosity of at least one million centipoise for the polydiorganosiloxane; a so-called silicone gum. When the viscosity of Component (a) is greater than 100,000 centipoise but less than 1 million centipoise, a suitable quantity of organic solvent, as will be discussed below, is added.

It is preferred that the molecular weight of Component (a), and therefore the value of n, correspond to a viscosity of at least 500,000 cP (centipoise), preferably at least 1,000,000 cP, and most preferably at least 10,000,000 cP when measured at 25° C. For example, when all R radicals are methyl, or optionally up to about 5% vinyl and the remainder methyl, the average value of n will range upwards from about 1500, preferably upwards from about 1800 and most preferably upwards from about 3000. For other R radicals the corresponding value of n will depend upon the particular R radicals that are present in the polydiorganosiloxane. In general the so-called silicone gums are preferred here, where the value of n can be as large as 5000 and more.

Alkenyl-terminated polydiorganosiloxanes are well known in the organosilicone art and their syntheses need no further delineation herein. Generally, an alkenyl-containing terminating reactant, such as divinyltetramethyldisiloxane, is equilibrated with a diorganosiloxane reactant, such as octamethylcyclotetrasiloxane, in the presence of an acidic or alkaline catalyst. A phenyl radical-containing and/or a vinyl radical-containing diorganosiloxane reactant can also be included in the reaction mixture to introduce phenyl and/or vinyl radicals into the polymer chain, if desired. Additionally, phenyl radicals can be incorporated into the alkenyl radical-containing terminating reactant, if desired. The molecular weight of the polydiorganosiloxane can be controlled by use of the appropriate amount of terminating reactant, in the well-known manner.

A preferred polydiorganosiloxane (a) has the formula $ViMe_2SiO(Me_2SiO)_nSiMe_2Vi$ wherein Me denotes the methyl radical, Vi denotes the vinyl radical and n has a value sufficient to provide a viscosity of at least 10,000,000 centipoise at 25° C.

Component (b) that is used to prepare the SPSA is an organopolysiloxane which is constituted of $R^2_3SiO_{1/2}$ units and $SiO_2$ units. In the above formula, $R^2$ is selected from among alkyl radicals such as methyl, ethyl, and propyl, etc.; alkenyl radicals such as vinyl and allyl, etc.; and the hydroxyl radical. At least 95 mol percent of all radicals $R^2$ are to be methyl. Furthermore, in the present invention, the total $R^2$ radical complement is to contain no more than 0.5 mol percent, and preferably contains 0 mol percent, alkenyl radicals.

The molar ratio of $R^2_3SiO_{1/2}$ units to $SiO_2$ units must fall within the range of 0.6:1 to 0.9:1. The tackiness is reduced at below 0.6 $R^2_3SiO_{1/2}$ units per $SiO_2$ unit, while the cohesive strength is reduced at above 0.9 $R^2_3SiO_{1/2}$ units per $SiO_2$ unit.

Methods for synthesizing and analyzing such organopolysiloxanes are known. The disclosures of U.S. Pat. Nos. 2,676,182 and 3,284,406 are incorporated herein by reference to show the preparation of organopolysiloxanes which are suitable as Component (b) in this invention.

Component (b) can contain as much as 3.5 weight percent residual silanol radicals which arise from the hydrolysis of reactive silanes that are used in its preparation. Component (b) preferably contains no more than 1 weight percent silicon-bonded hydroxyl radicals based on the total weight of Component (b), and preferably contains no more than 0.6 weight percent. A high adhesive strength cannot be obtained when the content of silicon-bonded hydroxyl radicals in Component (b) exceeds 1 weight percent. This hydroxyl radical content is particularly important in the preferred embodiments of the present invention.

Component (c) that is used to prepare the SPSA is an organohydrogenpolysiloxane having an average of at least 2 silicon-bonded hydrogen atoms in each molecule and functions as a crosslinker for Component (a). Curing proceeds by the platinum-catalyzed addition reaction of the silicon-bonded hydrogen atoms in this component with the alkenyl radicals in Component (a) under the catalytic activity of Component (d).

Component (c) can be any of the currently known organohydrogenpolysiloxanes having an average of at least two, and preferably three or more, silicon-bonded hydrogen atoms per silicon atom. The molecular structure of this component is not critical and can be cyclic, linear, branched and/or network, as desired. The organic radicals in Component (c) can be any monovalent hydrocarbon radical free of aliphatic unsaturation, as is well known, such as the general and specific alkyl and aryl radicals denoted above for Component (a). For maximum compatibility of Components (a), (b) and (c) the organic radicals in each component are preferably the same.

In a preferred embodiment of this invention Component (c) is a linear methylhydrogenpolysiloxane comprised of methylhydrogensiloxane siloxane units and, optionally, dimethylsiloxane units. The terminal siloxane units of this linear siloxane are not critical and can be triorganosiloxane units or diorganohydrogensiloxane units or mixtures thereof, wherein the organic radicals are, for example, methyl.

Examples of preferred Component (c) include compounds having the formula Me$_3$SiO(MeHSiO)$_a$(Me$_2$SiO)$_b$SiMe$_3$ wherein a has an average value of at least 3 and b has an average value of 0 or more and compounds having the formula Me$_3$SiO(MeHSiO)$_a$SiMe$_3$ wherein a has a value of from 30 to 70.

Component (d) that is used to prepare the SPSA is a platinum-containing catalyst, and it promotes the addition reaction of Component (a) with Component (c). Concrete examples here are chloroplatinic acid, chloroplatinic acid-olefin complexes, chloroplatinic acid-vinylsiloxane complexes, and platinum supported on a microparticulate carrier such as alumina.

A particularly useful platinum-containing catalyst for the SPSA compositions is the chloroplatinic acid-vinylsiloxane complex disclosed by Willing in U.S. Pat. No. 3,419,593, hereby incorporated by reference. However, the platinum-containing catalyst can be any of the well-known materials that are effective for catalyzing the hydrosilylation reaction of silicon-bonded hydrogen atoms with silicon-bonded alkenyl radicals. The quantities of Components (a) and (b) that are present in the SPSA can range, independently, from 30 to 70 parts by weight each. Thus the weight ratio of Component (a) to Component (b) can range from about 0.43 to about 2.33.

The quantity of Component (c) is to be sufficient to provide 1 to 40, preferably 2 to 20, silicon-bonded hydrogen atoms per alkenyl radical in Component (a); a satisfactory cohesive strength cannot be generated when either more than 40 or when less than 1 is present.

Component (d) is added in a quantity sufficient to give from 0.1 to 1000, and preferably 1 to 300, parts by weight of platinum for every one million parts by weight of the combined quantity of Components (a) through (c). The crosslinking reaction will be unsatisfactory at below 0.1 part, and the cohesive strength will thus be reduced, while exceeding 1,000 parts is disadvantageous due to the resulting short use time and high cost.

In addition to Components (a) to (d), an appropriate quantity of an organic solvent can be used in the present invention to dissolve Components (a) through (d) and provide for ease of application of the pressure sensitive adhesive composition to various substrates. Concrete examples of this component are hydrocarbon solvents, such as toluene, xylene and mineral spirits; and halogenated hydrocarbon solvents, but no specific restriction is placed on this component as long as it is an organic solvent which can dissolve Components (a) through (c) and which does not inhibit the aforementioned addition reaction.

In addition to Components (a) through (d), any of the addition-reaction inhibitors known in the art may be added to the SPSA compositions. Concrete examples thereof are the ene-ynes, such as 3-methyl-3-pentene-1-yne and 3,5-dimethyl-3-hexene-1-yne; the alkynyl alcohols, such as 3-methyl-1-butyne-3-ol, 3,5-dimethyl-1-hexyne-3-ol, 3-methyl-1-pentyne-3-ol, and phenylbutynol; the unsaturated ester, such as alkyl, alkoxyalkyl and substituted alkyl maleates; and polymethylvinylcyclosiloxanes.

Furthermore, the addition of small quantities of supplementary components to the composition is permissible. Such supplementary components are, for example, the various antioxidants, pigments, stabilizers, fillers, etc.

Component (e) that is used to prepare the adhesive-releasing coating is a fluorosilicone polymer having the formula YMe$_2$SiO(Me$_2$SiO)$_x${R$^3$Si(Me)O}$_y$(MeASiO)$_z$SiMe$_2$Y.

In this formula the terminal Y radicals denote Me, A or R$^3$Q radicals. Each Y can be methyl, alkenyl or R$^3$Q without significantly altering the release properties of a laminate of this invention. However, it may be desirable that the terminal Y radicals be alkenyl under moderate curing conditions, such as low curing temperatures, short curing times or attenuated curing catalyst activity.

Examples of A radicals include vinyl, allyl, butenyl, pentenyl, hexenyl, octenyl and decenyl. Preferably the aliphatic unsaturation in the alkenyl curing radicals is in the terminal, i.e. omega position.

R$^3$ denotes a perfluoroalkyl radical having from 2 to 8 carbon atoms and Q denotes a divalent hydrocarbon radical linking the R$^3$ radical to a silicon atom by at least 2 carbon atoms.

The numerous R$^3$ radicals can be identical or different and can have a normal or a branched structure. Examples thereof include CF$_3$; C$_2$F$_5$; C$_3$F$_7$; C$_4$F$_9$, such as CF$_3$CF$_2$CF$_2$CF$_2$, (CF$_3$)$_2$CFCF$_2$, (CF$_3$)$_3$C and CF$_3$CF$_2$(CF$_3$)CF; C$_5$F$_{11}$, such as CF$_3$CF$_2$CF$_2$CF$_2$CF$_2$; C$_6$F$_{13}$, such as CF$_3$(CF$_2$)$_4$CF$_2$; C$_7$F$_{15}$, such as CF$_3$(CF$_2$CF$_2$)$_3$; and C$_8$F$_{17}$.

Each Q radical can have any hydrocarbon structure; however, each Q is preferably an alkylene radical having a normal or branched structure. Examples of suitable alkylene radicals include CH$_2$CH$_2$, CH$_2$,CH$_2$, CH$_2$, CH$_2$(CH$_3$)CH$_2$, (CH$_2$CH$_2$)$_2$, CH$_2$(CH$_3$)CH$_2$CH$_2$ and CH(CH$_3$)CH$_2$.

Each fluorinated radical, R$^3$Q, preferably has the formula R$^3$CH$_2$CH$_2$ and most preferably the formula CF$_3$CF$_2$CF$_2$CF$_2$CH$_2$.

In the above formula for Component (e) the values of x, y and z are such that the fluorosilicone polymer contains from 0.1 to 10, preferably 0.1 to 1.0, mol percent alkenyl-containing siloxane units and at least 5, preferably at least 30, mol percent siloxane units bearing R$^3$Q radicals.

General examples of preferred fluorosilicone polymers include, but are not limited to, the following:

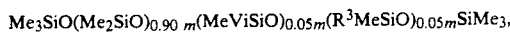

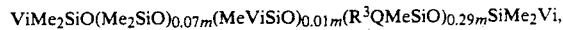

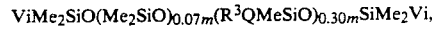

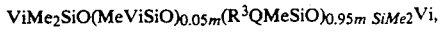

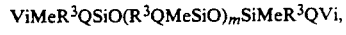

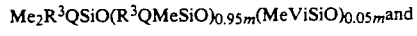

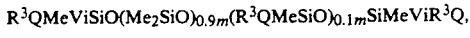

wherein the viscosity of the polymer ranges from that of a freely flowing liquid to a slowly flowing gum and m has a value of from 100 to 10,000 and more.

The values of m, x, y and z for the linear fluorosilicone polymer denote average values, as is well known in the art, and are such that the polymer contains the requisite amount of alkenyl-containing siloxane units and fluorinated siloxane units and has the desired viscosity at 25° C. The values of m, x, y, z and x+y+z thus will vary greatly, depending on the fluorinated siloxane unit content, the structure of the fluorinated radicals and the viscosity of the polymer. As the mol percent of fluorinated siloxane units in the polymer, and/or the size of the fluorinated radicals therein, increases, the viscosity of the polymer increases.

While the values of x, y and z can each be as small as zero the values of x and y can range to 10,000 and more and the value of z typically is limited to a fraction, such as from 1/100 to 2/10, of the sum of $x+y+z$.

For the purpose of providing a fully cured coating on a backing which will release SPSA, cast and cured thereon, with a force of no more than 300 grams per inch, it is preferred that the fluorosilicone polymer have the formula $ViMe_2SiO(Me_2SiO)_x\{R^3QSi(Me)O\}_y(MeViSiO)_zSiMe_2Vi$ wherein the sum of $x+y+z$ has a value of about 2500 and each has an value such that the fluorosilicone polymer contains from 0.1 to 1.0 mol percent vinyl-containing siloxane units, at least 30, preferably 30 to 50, mol percent siloxane units bearing $R^3Q$ radicals and the balance dimethylsiloxane units.

The fluorosilicone polymer (e) can be prepared by any of several method disclosed in the art. For example, organo-terminated polymers can be prepared by the method of Pierce et al., U.S. Pat. No. 2,961,425; or by the method of Brown et al., U.S. Pat. No. 4,736,048. The patents to Brown et al. and to Pierce et al. are incorporated herein by reference to show how to prepare fluorosilicone polymers.

Component (f) that is used to prepare the fluorosilicone adhesive-releasing coating is an organohydrogenpolysiloxane having an average of at least 2 silicon-bonded hydrogen atoms in each molecule and functions as a crosslinker for Component (e). As with the SPSA delineated above curing of the fluorosilicone proceeds by the platinum-catalyzed addition reaction of the silicon-bonded hydrogen atoms in this component with the alkenyl radicals in Component (e) under the catalytic activity of Component (g).

Component (f) can be any of the currently known organohydrogenpolysiloxanes having an average of at least two, and preferably three or more, silicon-bonded hydrogen atoms per silicon atom. The molecular structure of this component is not critical and can be cyclic, linear, branched and/or network, as desired. The organic radicals in Component (f) can be any monovalent hydrocarbon radical free of aliphatic unsaturation, as is well known, such as the general and specific alkyl and aryl radicals denoted above for Component (e). For maximum compatibility of Components (e) and (f) the organic radicals in each component are preferably the same.

Examples of Component (f) include, but are not limited to, organohydrogen silicon compounds bearing a plurality of silicon-bonded hydrogen atoms, such as cyclic, linear and resinous siloxanes; such as methylhydrogencyclopolysiloxanes having the unit formula $MeHSiO_{2/2}$; linear methylhydrogenpolysiloxanes having the formulae $Me_3SiO(MeHSiO)_i(Me_2SiO)_jSiMe_3$ and $HMe_2SiO(MeHSiO)_i(Me_2SiO)_jSiMe_2H$ where i and j have values of zero or more; and branched siloxanes such as $(HMe_2SiO)_4Si$. Specific examples of organohydrogenpolysiloxanes that are useful as Component (f) are the same as those set forth above for Component (c).

To improve the compatability of the organohydrogenpolysiloxane (f) with the fluorosilicone polymer (e) it is desirable to have up to half of the organic radicals in (f) be $R^3Q$ radicals, where $R^3$ is preferably the same as it is in (e), and the remaining organic radicals being methyl radicals.

Thus, the fluorosilicone crosslinkers disclosed by Holbrook in U.S. Pat. No. 3,344,160 and by Carter et al. in U.S. Pat. No. 4,057,566, incorporated herein by reference, and organohydrogenpolysiloxanes having the general formulae $Me_3SiO(MeHSiO)_i(MeR^3QSiO)_jSiMe_3$ and $HMe_2SiO(MeHSiO)_i(MeR^3QSiO)_jSiMe_2H$ where i and j have values of zero or more are preferred organohydrogenpolysiloxanes in the fluorosilicone adhesive-releasing composition.

In view of the favorable curing rate that it provides for the coating composition that is used to provide the adhesive-releasing coating of the laminates of this invention an organohydrogenpolysiloxane having the formula $Me_3SiO(MeHSiO)_{28}\{R^3QSi(Me)O\}_{12}SiMe_3$ wherein $R^3Q$ has the formula $CF_3CF_2CF_2CF_2CH_2CH_2$, is a preferred Component (f).

Organohydrogenpolysiloxanes bearing $R^3Q$ radicals can be synthesized by well-known methods. In addition to the methods of Holbrook et al. and of Carter et al. the methods noted above for the preparation of fluorosilicone polymer (e) can be used with the proviso that silane and/or siloxane intermediates bearing silicon-bonded hydrogen atoms be included as reactants in the synthesis methods disclosed.

Component (g) that is used in the adhesive-releasing coating is a platinum-containing catalyst which will accelerate the reaction of the alkenyl radicals of Component (e) with the crosslinking agent (f), particularly at elevated temperature. Examples of this component are the same as those set forth above for Component (d).

The amount of Component (f) to be used in the fluorosilicone adhesive-releasing compositions is merely that amount that will provide from 1 to 40, preferably from 1 to 10, and most preferably from 1 to 4, silicon-bonded hydrogen atoms for every alkenyl radical in the fluorosilicone polymer.

Beyond the need for a complete cure it is usually desirable to use a sufficient amount of a curing catalyst in the adhesive-releasing compositions to provide a rapid cure rate. The exact amount of said catalyst will depend on the particular catalyst that is used and is not easily predicted. However, for chloroplatinic acid and its complexes, an amount sufficient to provide from 0.1 to 1000, preferably 1 to 500, parts by weight of platinum for every one million parts by weight of the fluorosilicone polymer is usually sufficient. Within this range routine experimentation can be used to determine the optimum amount of catalyst needed for any particular cure time.

The adhesive-releasing compositions can further comprise various amounts of optional components that will not adversely limit its use as a coating composition for the release of SPSAs. Examples thereof include reactive components, such as adhesion promoters to improve the bonding of the cured composition to a substrate and catalyst activity attenuators to inhibit the activity of the catalyst at room temperature; and unreactive components such as diluents to decrease the viscosity and/or to increase the coatability of the curable composition.

Preferred diluents include halogenated solvents, such as chlorofluorocarbons; esters, such as ethyl acetate; ketones such as methylisobutyl ketone; and ethers, such as dibutyl ether.

Preferred catalyst activity attenuators include methylvinylcyclosiloxanes; esters of unsaturated alcohols and/or unsaturated acids, such as diallyl maleate and bis-(2-methoxyisopropyl) maleate; acetylenic compounds, such as methylbutynol; and ene-ynes, such as ethynylcyclohexene. The reader is referred to, for example, the disclosures of U.S. Pat. Nos. 3,445,420; 4,256,870; 4,465,818 and 4,562,096, to further illustrate the optional attenuator component.

The backing that is used to manufacture the liner of this invention can be any flexible material such as, for example, polymeric film; such as films of polyester, polyolefin, or polyimide; glass wool; metal foil; polymeric film-coated metal foil; paper; such as Japanese paper and synthetic paper; textiles; and polymeric film-coated paper.

The laminate of the present invention can comprise any addition-cured SPSA comprising components (a) to (d), delineated above, adhered to any liner comprising any of the addition-cured, adhesive-releasing coatings consisting essentially of components (e) to (g), also delineated above, durably adhered to any of the backings delineated above. However, I have discovered that certain combinations of SPSA and liner comprising Components (a) to (g) provide laminates having commercially desirable properties.

Thus, in a preferred embodiment of this invention, the laminate comprises a layer of SPSA having a subsequent tack as high as 1100 grams per square centimeter, and a subsequent adhesion as high as 1200 grams per inch, adhered to a liner bearing an adhesive-releasing coating that provides a release no greater than 300 grams per inch.

In this preferred embodiment the SPSA is prepared from a solution of components comprising a Component (a) having the formula $ViMe_2SiO(Me_2SiO)_n$-$SiMe_2Vi$ wherein n has a value sufficient to provide a viscosity of at least 10,000,000 centipoise at 25° C. for Component (a); a Component (b) having a silicon-bonded hydroxyl content of no more than 0.6 weight percent and $R^2$ denotes the methyl radical; a Component (c) having the formula $Me_3SiO(MeHSiO)_aSiMe_3$ wherein a has a value of from 30 to 70 and a platinum-containing catalyst.

The liner in the preferred laminate of this invention is to be prepared by coating a backing, preferably a flexible polymeric sheeting, with a chlorofluorocarbon solvent-solution of components consisting essentially of a Component (e) having the formula $ViMe_2SiO(Me_2SiO)_x\{R^3QSi(Me)O\}_y(MeViSiO)_zSiMe_2Vi$ wherein the sum of $x+y+z$ has a value of about 2500 and the individual values of x, y and z are each greater than zero and are such that the fluorosilicone polymer contains from 0.1 to 1.0 mol percent alkenyl-containing siloxane units and at least 30 mol percent siloxane units which bear $R^3Q$ radicals where $R^3Q$ has the formula $CF_3CF_2CF_2CF_2CH_2CH_2$; a Component (f) having the formula $Me_3SiO(MeHSiO)_{28}\{R^3QSi(Me)O\}_{12}SiMe_3$ wherein $R^3Q$ has the formula $CF_3CF_2CF_2CF_2CH_2CH_2$ and a platinum-containing catalyst.

The laminates of this invention can be prepared by any process which comprises contacting the liner with the SPSA. For example, the laminate can be prepared by a process comprising forming a liner by applying to at least one surface of a backing a coating of a composition comprising a curable adhesive-releasing composition consisting essentially of Components (e) to (g); causing the applied curable adhesive-releasing composition to cure; contacting the liner with a layer of a curable pressure sensitive adhesive composition comprising Components (a) to (d); and causing the applied curable pressure sensitive adhesive composition to cure. Alternatively, said liner can be applied to a layer of cured pressure sensitive adhesive being the reaction product of components comprising Components (a) to (d).

If the liner is not initially brought into contact with the SPSA by a surface which bears an adhesive-releasing surface which is the reaction product of Components (e) to (g), it is subsequently so-contacted. In other words, the laminate of this invention can be prepared by contacting the liner, by any surface thereof, with the SPSA, cured or uncured, and including contacting the SPSA with the fluorosilicone adhesive-releasing coating.

The laminate of this invention can have any form that comprises a layer of SPSA, as delineated above, and a liner, as delineated above, adhered to at least a portion of said layer of pressure sensitive adhesive.

For example, the laminate can comprise nothing more than said SPSA and said liner. However, the laminate of this invention will typically further comprise an additional item adhered to the SPSA. Said additional item can be, for example, a support for the SPSA, durably adhered thereto. Examples of a support include a label; a cured foam, a tape, one side of which serves as the liner of said laminate; an hygienic article, a decorative item, etc. Alternatively, said item can be another liner; such as a separate liner identical to, or distinct from, the first liner of the laminate; or another portion of the first liner, such as in a tape form which provides a free adhesive film via differential release of the SPSA from two liners.

DESCRIPTION OF THE DRAWINGS

The laminate of this invention is illustrated in some of its forms by the accompanying drawings.

Figure 1:
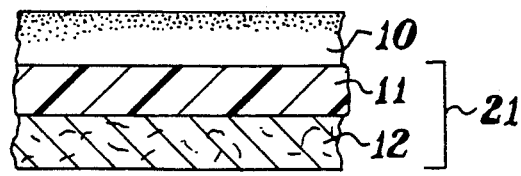
FIG. 1 is a sectional view of a laminate which comprises a liner (21) made up of a backing (12) bearing a durably adhered release coating of this invention (11) which is releasably adhered to a layer of SPSA of this invention (10). This laminate can be used to position a layer of SPSA onto a support to provide a laminate illustrated by FIG. 2, or onto additional liner to provide a laminate illustrated by FIG. 3, or onto a liner not of this invention to provide a laminate illustrated by FIG. 6. Alternatively, the laminate of FIG. 1 can be rolled into a coil form, in such a manner as to durably adhere its exposed SPSA to the surface of the backing that does not contain the adhesive-releasing layer, thereby forming a tape.
Figure 4:
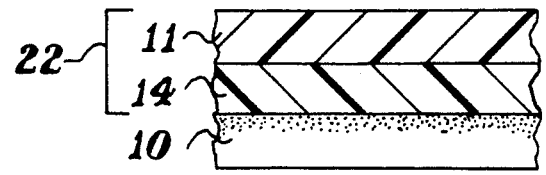
FIG. 4 is a sectional view of a laminate which comprises a liner/support (22) made up of a backing/support (14) bearing a durably adhered release coating (11) and a durably adhered SPSA. The laminate of FIG. 4 can be rolled into a coil form, in such a manner as to adhere its exposed SPSA to the surface of the backing that contains the adhesive-releasing layer, thereby forming a tape.
Figure 2:
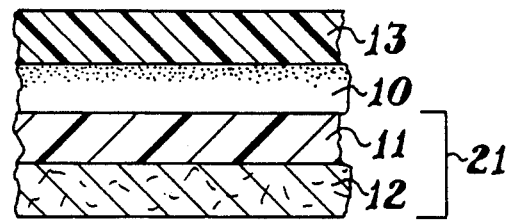
FIG. 2 is a sectional view of a laminate which comprises a liner (21) made up of a backing (12) bearing a durably adhered release coating (11) which is releasably adhered to a layer of SPSA (10) bearing a durably adhered support (13), such as a label, an ostomy device, a medicinal reservoir or an emblem.
Figure 5:
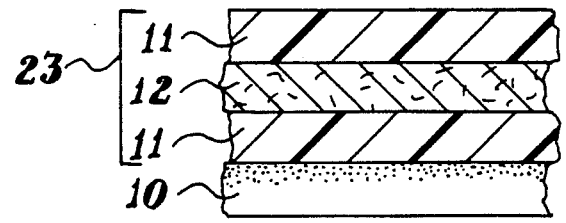
FIG. 5 is a sectional view of a laminate which comprises a double liner (23) made up of a backing (12) bearing a durably adhered release coating (11) on each side thereof, one coating of which is releasably adhered to a layer of SPSA (10). The laminate of FIG. 5 can be rolled into a coil form in a manner such that the remaining adhesive-releasing coating is brought into releasable contact with the exposed surface of the SPSA of the laminate, thereby forming a source of a strip of free adhesive. As with the laminate of FIG. 3 a laminate illustrated by FIG. 5 typically possesses the property of differential release.
Figure 3:
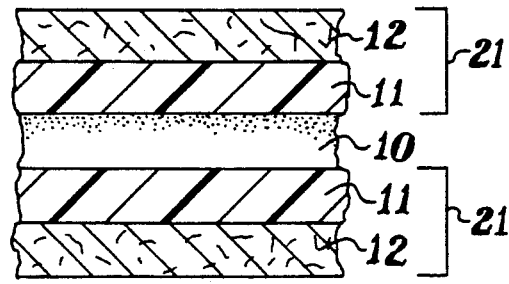
FIG. 3 is a sectional view of a laminate which comprises a two liners (21) each made up of a backing (12) bearing a durably adhered release coating (11) which is releasably adhered to a layer of SPSA (10). An example of an item represented by this figure is a sheet or strip laminate for positioning a free layer of SPSA onto a surface. Typically, this laminate has the property of differential release wherein the first-removed liner is removable from the SPSA with a force substantially less than the force needed to remove the second-removed liner.
Figure 6:
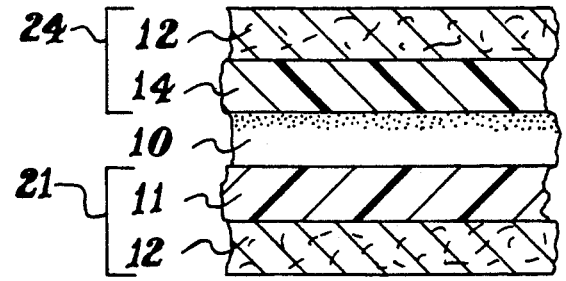
FIG. 6 is a sectional view of a laminate which comprises a liner of this invention (21) made up of a backing (12) bearing a durably adhered release coating (11) which is releasably adhered to a layer of SPSA (10) and a liner not of this invention (24) made up of a backing (12) bearing a durably adhered release coating not of this invention (14). An example of an item represented by this figure is a sheet or strip laminate for positioning a free layer of SPSA onto a surface. Typically, this laminate has the property of differential release wherein the first-removed liner is removable from the SPSA with a force substantially less than the force needed to remove the second-removed liner.

The present invention will be further explained, but not limited, by the following illustrative examples. In the examples, part=parts by weight, and %=wt%. The properties reported in the examples were measured by the following methods.

Release of a laminate was determined by cutting the laminates into 1×6 inch strips and the laminate was pulled apart at a rate of 12 inches/minute using a Keil Tester. The Keil Tester is described in TAPPI, vol. 43, No. 8. pages 164A and 165A (August 1960).

Subsequent Adhesion of an adhesive was measured by applying the released adhesive, that was used to determine release, to a clean stainless steel panel, using two passes of a 4.5 pound roller, and measuring the force required to remove the tape therefrom, using the Keil tester as noted above.

Subsequent Tack was measured on the released adhesive, i.e. after liner removal, using a Polyken Probe Tester. Dwell time was 0.5 seconds and pull speed was 0.5 cm/sec.

Adhesion of an adhesive was measured by applying the adhesive, that had never been applied to a release surface, to a clean stainless steel panel and measuring the force required to remove the tape therefrom.

The following adhesives are referenced in the examples.

Adhesive No. 1—A peroxide-curing SPSA available from Dow Corning Corporation as DOW CORNING (R) Q2-7406 Adhesive. This adhesive is cured with 2% benzoyl peroxide.

Adhesive No. 2—A peroxide-curing SPSA available from Dow Corning Corporation as DOW CORNING (R) X2-7581 Adhesive formulated to have optimum release from a fluorosilicone release coating. This adhesive is cured with 2% benzoyl peroxide.

Adhesive No. 3—An addition-curable SPSA consisting of 55 parts methylpolysiloxane composed of $(CH_3)_3SiO_{1/2}$ units and $SiO_2$ units in a 0.7:1 molar ratio and having a hydroxyl radical-content of 0.5%, 45 parts dimethylvinylsiloxy-terminated polydimethylsiloxane gum having a vinyl radical content of 0.02%, 0.2 parts trimethylsiloxy-terminated methylhydrogenpolysiloxane having a viscosity of 20 centipoise and containing 1.6% silicon-bonded hydrogen atoms, 0.2 parts 3-methyl-1-butyne-3-ol reaction inhibitor; and 150 parts toluene. The molar ratio of silicon-bonded hydrogen atoms to vinyl radicals was 9.6:1 in this mixture.

This adhesive is cured with 0.9% of a 50% solution in toluene of a chloroplatinic acid-vinylsiloxane complex.

Adhesive No. 4—An addition-curable SPSA consisting of 57 parts methylpolysiloxane composed of $(CH_3)_3SiO_{1/2}$ units and $SiO_2$ units in a 0.7:1 molar ratio and having a hydroxyl radical-content of 3.5%, 43 parts phenylmethylvinylsiloxy-terminated polydimethylsiloxane gum having a viscosity of 40,000 centipoise, 0.2 parts trimethylsiloxy-terminated methylhydrogendimethylcopolysiloxane containing about 5 silicon-bonded hydrogen atoms per molecule, 0.2 parts 3-methyl-1-butyne-3-ol reaction inhibitor; and 7 parts xylene. The molar ratio of silicon-bonded hydrogen atoms to vinyl radicals was 2.5:1 in this mixture.

This adhesive is cured with 0.9% of a 50% solution in toluene of a chloroplatinic acid-vinylsiloxane complex.

EXAMPLE 1

An fluorosilicone adhesive-release coating composition consisting of 10 parts of a vinyldimethylsiloxane-endblocked fluorosilicone polymer having about 2500 silicon atoms per molecule, including 30 mol% $C_4F_9CH_2CH_2SI(CH_3)O_{2/2}$ units, 0.5 mol% $CH_2=CHMeSiO_{2/2}$ units and the balance dimethylsiloxane units; 89.7 parts of trichlorotrifluoroethane; 0.3 part of a complex of divinyltetramethyldisiloxane and $H_2PtCl_6$; a curedelaying amount of a catalyst inhibitor and a sufficient amount of $Me_3SiO(MeHSiO)_{35}SiMe_3$ to provide 4 silicon-bonded hydrogen atoms for each silicon-bonded vinyl radical in the composition was coated onto a piece of 2-mil polyester film using a #8 Mayer Rod and the coated film was heated at 302° F. for 24 seconds to cure the coating and to provide a cured coat weight of 0.6 pounds per ream.

Thereafter (about 6 months) solutions of Adhesives 1, 2 and 3, noted above, were cast onto the cured coating of each of three liners with a 3 mil Bird Bar thickness to provide a dry thickness of 1.5 mils of adhesive. Adhesive Nos. 1 and 2 were cured for 1 minute at 70° C. and then for 2 minutes at 178° C. Adhesive No. 3 was cured at 100° C. for 3 minutes. The resulting three laminates were cooled to room temperature and a 2 mil polyester film support was durably adhered to the exposed SPSA.

The laminates were evaluated for release, subsequent adhesion and subsequent tack by the methods described above. The values recorded in Table 1 are the average of 5 readings taken during the course of one pull per sample.

TABLE I

| ADHESIVE | RELEASE, g/in. | | | SUB. ADH., g/in. | | | SUB. TACK. g/cm² | | |
|---|---|---|---|---|---|---|---|---|---|
| | 1 WK | 2 WK | 4 WK | 1 WK | 2 WK | 4 WK | 1 WK | 2 WK | 4 WK |
| No. 1 | 171 | 224 | 321 | 1450 | 1390 | 1280 | 1202 | 1226 | 1142 |
| No. 2 | 19 | 9 | 19 | 1112 | 1262 | 1169 | 714 | 967 | 570 |
| No. 3 | 111 | 110 | 111 | 1322 | 1393 | 1319 | 1365 | 1548 | 1591 |

This example illustrates that the laminate of this invention has the unexpected property of stable release, compared to release of a laminate comprising a peroxide-cured SPSA.

Of course it will be apparent to the practitioner of the SPSA laminate art that the 2-mil polyester film backing can be replaced with a different polymeric film or a second release layer to produce additional laminates of this invention.

EXAMPLES 2 AND 3

Example 1 was repeated except that Adhesive Nos. 3 and 4 were used and the fluorosilicone polymer was cured with a sufficient amount of a crosslinker having the formula $Me_3SiO(MeHSiO)_{28}\{R^3QSi(Me)O\}_{1.2}SiMe_3$ to provide about 3 silicon-bonded hydrogen atoms for every silicon-bonded vinyl radical in the fluorosilicone polymer. $R^3Q$ had the formula $C_4F_9CH_2CH_2$. The data are summarized in Table II.

TABLE II

| ADHESIVE | RELEASE g/in. 1 WK | SUB. ADH., g/in. 1 WK | SUB. TACK, g/cm² 1 WK |
|---|---|---|---|
| No. 3 | 216 | 1557 | 1004 |
| No. 4 | 70 | 141 | 31 |

EXAMPLES 4 AND 5

Liners were prepared as described in Example 1 and in Examples 2 and 3 and Adhesive No. 3 was cast and cured onto each liner within an hour of their preparation. The resulting laminates were tested for release and subsequent properties; data are summarized in Table III.

TABLE III

| LINER | RELEASE, g/in. 1 WK | SUB. ADH., % 1 WK | SUB. TACK, g/cm² 1 WK |
|---|---|---|---|
| Example 1 | 635 | 94.1 | 66.2 |
| Example 2 | 295 | 98.1 | 72.9 |

This example illustrates the unexpectedly better release that is obtained from the preferred liner of this invention, i.e., the liner of Examples 2 and 3.

That which is claimed is:

1. As an article of manufacture a laminate comprising a layer of pressure sensitive adhesive and at least one liner adhered to at least a portion of said layer; said pressure sensitive adhesive being the reaction product of components comprising
   (a) 30 to 70 weight parts of a polydiorganosiloxane having the general formula $R^1R_2SiO(R_2SiO)_n$-$SiR_2R^1$ wherein each R is a monovalent hydrocarbon radical, each $R_1$ is an alkenyl radical and n is an integer,
   (b) 70 to 30 weight parts of an organopolysiloxane which is constituted of $R^2_3SiO_{1/2}$ units and $SiO_2$ units in a molar ratio in the range of $R^2_3SiO_{1/2}$ units and $SiO_2$ units in a molar ratio in the range of 0.6:1 to 0.9:1, wherein $R^2$ is selected from the group consisting of alkyl radicals, alkenyl radicals, and the hydroxyl radical, and methyl radicals comprise at least 95 mol percent of all $R^2$ radicals,
   (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl radical in component (a), and
   (d) a platinum-containing catalyst in a quantity sufficient to provide 0.1 to 1,000 weight parts platinum for each one million weight parts of the combined quantity of Components (a) through (c);

Component (a) having a viscosity of at least 500,000 centipoise at 25° C.; component (b) having a silicon-bonded hydroxyl content of no more than 1 weight percent; and Component (c) having the formula $Me_3SiO(MeHSIO)_a(Me_2SiO)_bSiOMe_3$ wherein a has an average value of at least 3 and b has an average value of 0 or more; and said liner comprising a backing bearing an adhesive-releasing coating durably adhered thereto which is the reaction product of components consisting essentially of (e) a fluorosilicone polymer having the formula $ViMe_2SiO(Me_2SiO)_x\{R^3QSi(Me)O\}_y(MeViSiO)_z$-$SiMe_2Vi$, wherein Me denotes methyl, Vi denotes vinyl, $R^3Q$ has a formula $CF_3CF_2CF_2CF_2CH_2CH_2$ and the sum of $x+y+z$ has a value of about 2500, and containing from 0.1 to 1.0 mol percent vinyl-containing siloxane units and at least 30 mol percent siloxane units which bear $R^3Q$ radicals,
   (f) an organohydrogenpolysiloxane having the formula $Me_3SiO(MeHSiO)_{28}\{R^3QSi(Me)\}_{12}SiMe_3$ wherein $R^3Q$ has the formula $CF_3CF_2CF_2CF_2CH_2CH_2$ and Me denotes methyl, in a quantity sufficient to provide 1–40 silicon-bonded hydrogen atoms per vinyl radical in Component (e), and
   (g) a platinum-containing catalyst in a quantity sufficient to provide 0.1 to 1,000 weight parts platinum for each one million weight parts of the combined quantity of Components (e) and (f).

2. An article according to claim 1 wherein the laminate has a release value for the pressure sensitive adhesive layer/adhesive releasing coating interface of less than 200 grams per inch and the pressure sensitive adhesive has a subsequent adhesion of at least 1200 grams per inch and a subsequent tack of at least 1100 grams per square centimeter.

3. An article according to claim 1 further comprising at least one support durably adhered to at least a portion of said layer of pressure sensitive adhesive.

4. An article according to claim 3 wherein the backing and support are independently selected from the group consisting of polymeric film, metal foil, polymeric film-coated metal foil, paper and polymeric film-coated paper.

5. An article according to claim 1 further comprising at least two liners adhered to at least two portions of said layer of pressure sensitive adhesive.

6. An article according to claim 1 wherein the Component (a) has the formula $ViMe_2SiO(Me_2SiO)_nSiMe_2Vi$ wherein Me denotes the methyl radical, Vi denotes the vinyl radical and n has a value sufficient to provide a viscosity of at least 10,000,000 centipoise at 25° C. for Component (a); Component (b) has a silicon-bonded hydroxy content of no more than 0.6 weight percent and $R^2$ denotes the methyl radical; and Component (c) has the formula $Me_3SiO(MeHSiO)_aSiMe_3$ wherein a has a value of from 30–70.

* * * * *